(12) United States Patent
Lindemann et al.

(10) Patent No.: US 10,400,875 B2
(45) Date of Patent: Sep. 3, 2019

(54) CLUTCH ENGAGEMENT RAMPS FOR TORQUE CONVERTER

(71) Applicant: Schaeffler Technologies AG & Co. KG, Herzogenaurach (DE)

(72) Inventors: Patrick Lindemann, Wooster, OH (US); John Carrier, Lodi, OH (US); Joshua Cerreta, Lakewood, OH (US); Matthew Payne, Glenmont, OH (US); Markus Steinberger, Macedonia, OH (US); Brian Zaugg, Millersburg, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/949,370

(22) Filed: Apr. 10, 2018

(65) Prior Publication Data

US 2018/0223975 A1    Aug. 9, 2018

Related U.S. Application Data

(62) Division of application No. 14/920,243, filed on Oct. 22, 2015, now Pat. No. 9,964,193.

(Continued)

(51) Int. Cl.
*F16H 45/02* (2006.01)
*F16F 15/121* (2006.01)
*F16F 15/131* (2006.01)

(52) U.S. Cl.
CPC ........... *F16H 45/02* (2013.01); *F16F 15/121* (2013.01); *F16F 15/13121* (2013.01);

(Continued)

(58) Field of Classification Search
CPC ............ F16H 45/02; F16H 2045/0205; F16H 2045/0247; F16H 2045/0236; F16H 2045/0278
See application file for complete search history.

(56) References Cited

U.S. PATENT DOCUMENTS 4,279,132 A    7/1981  Lamarche
4,360,352 A    11/1982 Lamarche
(Continued)

FOREIGN PATENT DOCUMENTS

WO        2008046377 A2    4/2008

*Primary Examiner* — Jacob S. Scott
*Assistant Examiner* — Lori Wu
(74) *Attorney, Agent, or Firm* — LeKeisha M. Suggs

(57) ABSTRACT

A torque converter including an axis of rotation and a flange rotatable about the axis of rotation is disclosed. The torque converter includes a turbine shell independently rotatable about the axis of rotation relative to the flange. A first plate, disposed between the flange and the turbine shell, may be fixed to the turbine shell. A second plate, disposed between the flange and the turbine shell, may be radially outward relative to the first plate. The torque converter further includes a cover having an inner surface and a third plate disposed between the flange and the cover. The first plate may include at least one ramp protruding in an axial direction toward the flange, wherein the ramp is rotatably engageable with the flange for urging the flange axially in a direction toward the cover, and for transmitting an axial force for urging a clutch to engage.

12 Claims, 14 Drawing Sheets

Related U.S. Application Data

(60) Provisional application No. 62/084,788, filed on Nov. 26, 2014, provisional application No. 62/157,661, filed on May 6, 2015.

(52) U.S. Cl.
CPC ........... *F16H 2045/0205* (2013.01); *F16H 2045/0236* (2013.01); *F16H 2045/0247* (2013.01); *F16H 2045/0263* (2013.01); *F16H 2045/0278* (2013.01)

(56) References Cited

U.S. PATENT DOCUMENTS

| | | |
|---|---|---|
| 7,445,099 B2 | 11/2008 | Maucher et al. |
| 8,033,370 B2 | 10/2011 | Degler |
| 2012/0043173 A1* | 2/2012 | Jameson ............... F16H 45/02 192/3.23 |
| 2012/0241273 A1 | 9/2012 | Kawahara et al. |
| 2013/0230385 A1 | 9/2013 | Lindemann et al. |
| 2014/0097055 A1 | 4/2014 | Lindemann et al. |
| 2014/0174878 A1 | 6/2014 | Hemphill et al. |
| 2017/0102060 A1 | 4/2017 | Carrier et al. |

\* cited by examiner

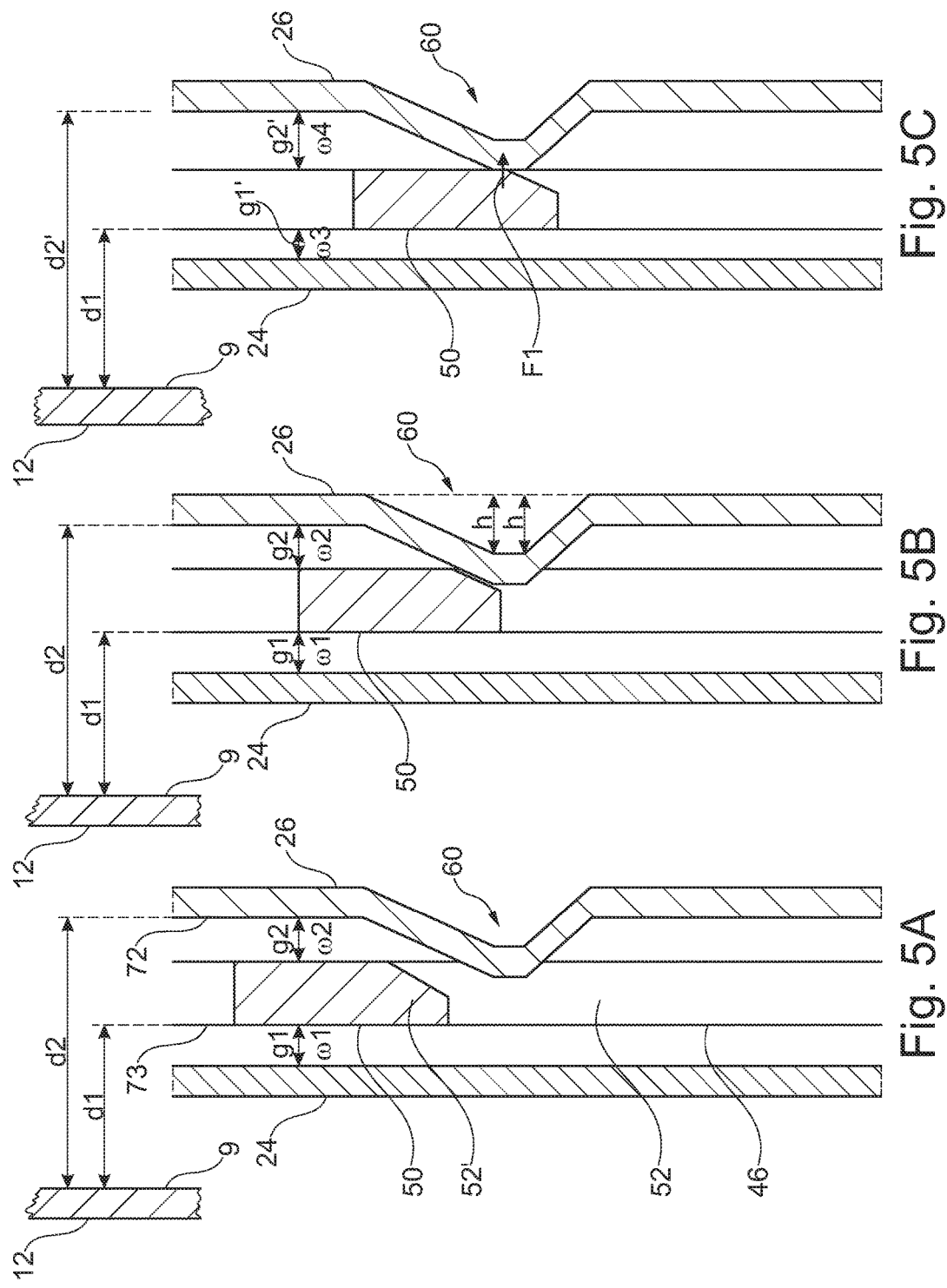

CLUTCH ENGAGEMENT RAMPS FOR TORQUE CONVERTER

CROSS-REFERENCE TO RELATED APPLICATIONS

This application is a divisional of U.S. application Ser. No. 14/920,243 filed Oct. 22, 2015, which, in turn, claims the benefit of U.S. provisional application Ser. No. 62/157,661 filed May 6, 2015 and U.S. provisional application Ser. No. 62/084,788 filed Nov. 26, 2014, the disclosures of which are hereby incorporated in their entirety by reference herein.

TECHNICAL FIELD

The present disclosure relates generally to a damper assembly featuring ramps for engaging a clutch. In particular, the damper ramps are rotatably engageable within the damper assembly to transmit an axial force for urging a torque converter clutch to engage.

BACKGROUND

Torque converter turbines incorporating lockup clutches are known. Examples are shown in commonly-assigned U.S. Pat. No. 7,445,099 in addition to U.S. Patent Publication Nos. US2013/0230385A1 and US2014/0097055A1, each hereby incorporated by reference herein.

BRIEF SUMMARY

Example aspects broadly comprise a turbine damper assembly comprising: an axis of rotation; first and second cover plates arranged to receive torque; a flange rotatable about the axis of rotation and axially disposed between the first and second cover plates; at least one resilient element, at least partially disposed axially between the first and second cover plates, for transmitting a torque force between the flange and the cover plates; a first axial gap, disposed between the flange and the first cover plate, having a first width; a second axial gap, disposed between the flange and the second cover plate, having a second width; at least one of the first cover plate, the second cover plate, or the flange having at least one ramp protruding in an axial direction, the ramp rotatably engageable with another of the at least one of the first cover plate, the second cover plate, or the flange to decrease the first axial gap, increase the second axial gap, and transmit an axial force for urging a clutch to engage. In an example aspect, the second cover plate includes the ramp and the flange is rotatable about the axis of rotation in a first circumferential direction relative to the first and second cover plates to engage the at least one ramp to decrease the first axial gap and increase the second axial gap. In an example aspect, the flange is rotatable about the axis of rotation in a second circumferential direction, opposite the first circumferential direction, to engage the at least one ramp to decrease the first axial gap and increase the second axial gap to increase clutch capacity. In an example aspect, the second cover plate includes the at least one ramp and the flange comprises an outer circumferential edge having at least one tab protruding therefrom, the tab rotatably engageable with the ramp.

Other example aspects broadly comprise torque converter comprising: an axis of rotation; a cover, a turbine comprising a turbine shell and a plurality of blades; an impeller comprising an impeller shell and a plurality of blades; a stator comprising a plurality of blades; a damper assembly comprising: first and second cover plates arranged to receive torque: at least one of the first or second cover plates having at least one ramp protruding in an axial direction; and; at least one of the first or second cover plates fixedly attached to the turbine shell; a flange, axially supported by the cover and axially disposed between the first and second cover plates; at least one resilient element, at least partially disposed axially between the first and second cover plates, for transmitting a torque force between the flange and the cover plates; and, a clutch including: a clutch plate; and, an apply plate. In an example aspect, the damper assembly further includes a first axial gap, disposed between the flange and the first cover plate, having a first width and a second axial gap, disposed between the flange and the second cover plate, having a second width. In an example aspect, the at least one ramp is rotatably engageable with the flange to decrease the first axial gap, increase the second axial gap, and transmit an axial force for urging the clutch to engage. In an example aspect, the torque converter further comprises a friction material disposed between the apply plate and the clutch plate, wherein the friction material is attached to one of the apply plate or the clutch plate or both. In an example aspect, the impeller shell includes the apply plate and the turbine shell includes the clutch plate. In an example aspect, the flange comprises an outer circumferential edge having at least one tab protruding therefrom in a radial direction, the tab rotatably engageable with the ramp. In an example aspect, the tab comprises: first and second flat surfaces, first and second side surfaces having first and second thicknesses, and, at least one tapered surface, connecting the second flat surface to the second side surface, wherein the at least one tapered surface is arranged for rotatably engaging the ramp. In an example aspect, the ramp further includes an apex portion and a rise portion, wherein the rise portion is rotatably engageable with the tapered surface. In an example aspect, the apex portion includes a flat portion for maintaining engagement with the tab. In an example aspect, the flange supported by the cover further includes a bushing, a thrust washer, or both disposed between the flange and the cover. In an example aspect, the flange is arranged for direct connection to a transmission input shaft. In an example aspect, the flange is rotatable in a first circumferential direction in coast mode to: engage the ramp, react on the cover; and, press or move one of the first or second cover plates to displace or deflect the turbine shell in an axial direction towards the impeller thus urging the clutch plate to touch the apply plate; or, is rotatable in a second circumferential direction, opposite to the first circumferential direction, in drive mode to: engage the ramp, react on the cover, and, press or move one of the first or second cover plates to deflect or displace the turbine shell in an axial direction towards the impeller thus increasing clutch capacity.

Other example aspects broadly comprise a torque converter comprising: an axis of rotation; a turbine comprising a turbine shell and a plurality of blades; an impeller comprising an impeller shell and a plurality of blades; a housing comprising a cover and the impeller shell; a stator comprising a plurality of blades; a damper assembly comprising: first and second cover plates arranged to receive torque; a flange rotatable about the axis of rotation, axially supported by the cover, and axially disposed between the first and second cover plates; at least one resilient element, at least partially disposed axially between the first and second cover plates, for transmitting a torque force between the flange and the cover plates; at least one of the first cover plate, the second cover plate, or the flange having at least one ramp protruding in an axial direction, the ramp rotatably engageable with another of the at least one of the first cover plate, the second cover plate, or the flange; a first axial distance, as measured between an inner surface of the cover and a first radial surface of the flange, remains unchanged as the ramp is rotatably engaged; a second axial distance, as measured between the inner surface of the cover and a second radial surface of the second cover plate, increases as the ramp is rotatably engaged; and, a clutch including: a clutch plate; and, an apply plate. In an example aspect, the turbine shell is fixed to the second cover plate and, as the ramp is rotatably engaged, the turbine shell is displaced in an axial direction towards the impeller. In an example aspect, the turbine shell includes the clutch plate. In an example aspect, the clutch is engaged as the ramp is rotatably engaged.

Other example aspects broadly comprise a torque converter comprising: an axis of rotation; a flange rotatable about the axis of rotation; a turbine shell independently rotatable about the axis of rotation relative to the flange; a first plate, disposed between the flange and the turbine shell, fixed to the turbine shell; a second plate, disposed between the flange and the turbine shell, radially outward relative to the first plate; a cover having an inner surface; a third plate, disposed between the flange and the cover, at least one resilient element, at least partially disposed axially between the second and third plates and radially outward relative to the first plate, for transmitting a torque force between the flange and the second and third plates; a first axial gap, disposed between the flange and the second plate, having a first width; a second axial gap, disposed between the flange and the third plate, having a second width; the first plate having at least one ramp protruding in an axial direction toward the flange, the ramp rotatably engageable with the flange for urging the flange axially in a direction toward the cover, and for transmitting an axial force for urging a clutch to engage. In an example aspect, the first plate is stamped and hardened. In an example aspect, the first plate is fixed to the turbine shell via a weld or a rivet. In an example aspect, the first plate is an annular plate and is cut or lanced to integrally form the at least one ramp having a first axial height. In an example aspect, the flange is rotatable about the axis of rotation in a first circumferential direction relative to the second and third plates to engage the at least one ramp. In an example aspect, the flange is rotatable about the axis of rotation in a second circumferential direction, opposite the first circumferential direction, to engage the at least one ramp to increase clutch capacity. In an example aspect, the second plate is fixed to the turbine shell. In an example aspect, the first and second plates are integrally formed. In an example aspect, the third plate includes a radially outward portion disposed between two pendulum masses.

Other example aspects broadly comprise a torque converter comprising: an axis of rotation; first and second cover plates arranged to receive torque; a flange rotatable about the axis of rotation; a turbine shell independently rotatable about the axis of rotation relative to the flange; an optional third plate, disposed between the flange and the turbine shell, fixed to the turbine shell; at least one resilient element, at least partially disposed axially between the first and second cover plates and radially outward relative to the third plate, for transmitting a torque force between the flange and the first and second cover plates; a first axial gap, disposed between the flange and the first cover plate, having a first width; a second axial gap, disposed between the flange and the second cover plate, having a second width; one of the first cover plate, the second cover plate, or the third plate having at least one ramp protruding in an axial direction toward the flange, the ramp rotatably engageable with the flange for urging the flange axially in a direction toward the cover, and for transmitting an axial force for urging a clutch to engage.

BRIEF DESCRIPTION OF THE DRAWINGS

The nature and mode of operation of the present disclosure will now be more fully described in the following detailed description of the present disclosure taken with the accompanying drawing figures, in which:

FIGS. 5A-5C illustrate a slice through a damper assembly according to an example aspect as viewed near the outer circumference of the assembly in order to schematically illustrate ramp engagement features at varying rotational positions. FIG. 5A shows a cover plate ramp not yet engaged with a flange tab. FIG. 5B shows a cover plate ramp and flange tab just before engagement according to an example aspect. FIG. 5C shows a cover plate ramp fully engaged with a flange tab according to an example aspect.

DETAILED DESCRIPTION

Figure 1:
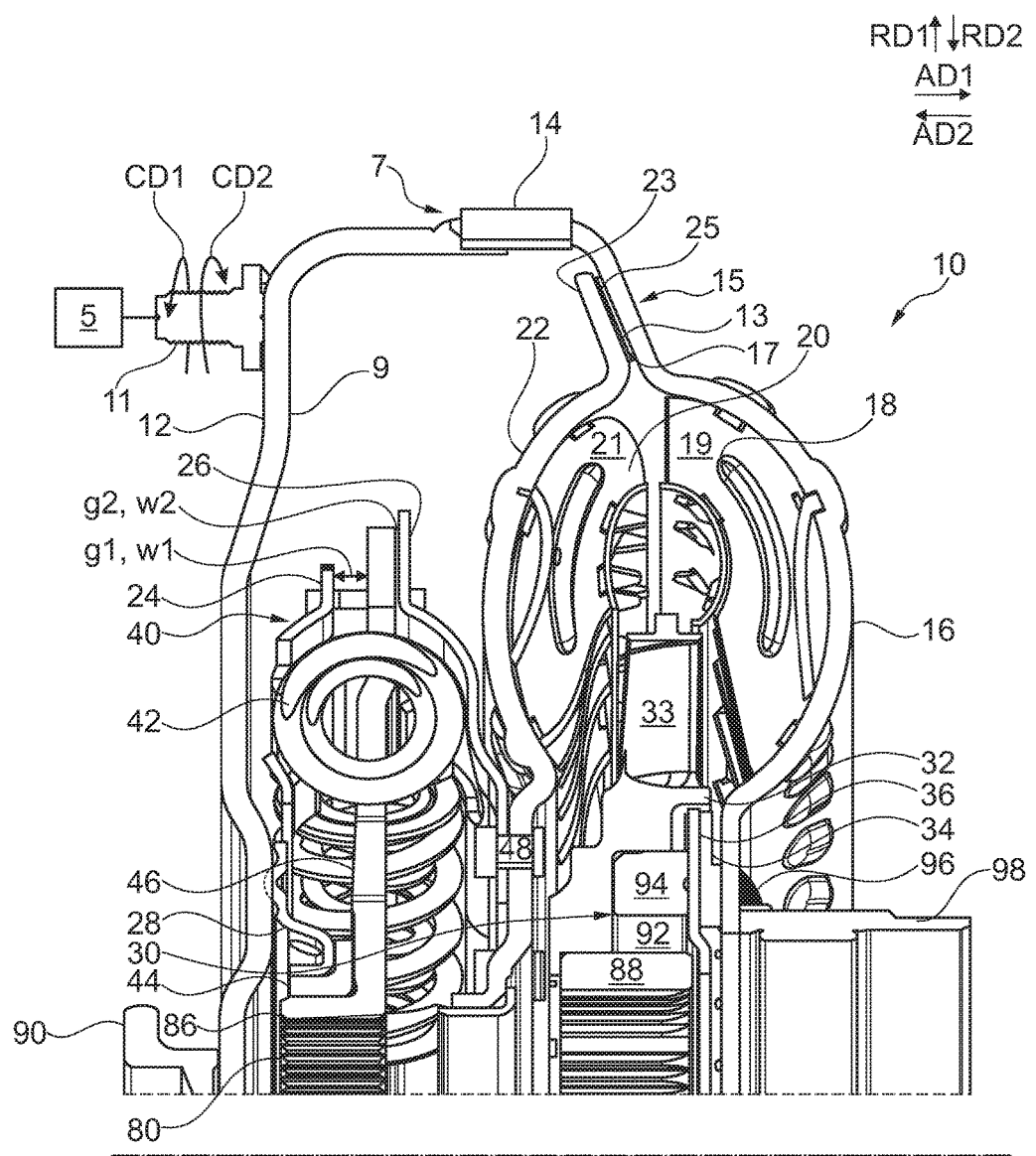
FIG. 1 illustrates a partial cross sectional side view of a torque converter including a damper assembly having clutch engagement damper ramps according to an example aspect.

At the outset, it should be appreciated that like drawing numbers appearing in different drawing views identify identical, or functionally similar, structural elements. Furthermore, it is understood that this present disclosure is not limited only to the particular embodiments, methodology, materials and modifications described herein, and as such may, of course, vary. It is also understood that the terminology used herein is for the purpose of describing particular aspects only, and is not intended to limit the scope of the present disclosure, which is limited only by the appended claims.

Unless defined otherwise, all technical and scientific terms used herein have the same meaning as commonly understood to one of ordinary skill in the art to which this present disclosure belongs. Although any methods, devices or materials similar or equivalent to those described herein can be used in the practice or testing of the present disclosure, the following example methods, devices, and materials are now described.

The axial forces between a turbine and an impeller in a torque converter are dependent on the direction of fluid flow in the torus. In the drive condition, the turbine pulls towards the impeller. In the coast condition, the turbine pushes away from the impeller. For torque converters with turbine clutches, for example, clutch engagement occurs more readily in drive mode. However, in coast mode the turbine is thrust in the opposite direction due to hydrodynamic forces thereby making clutch engagement more problematic. The thrust force in coast condition causes a larger gap between the impeller and turbine at the friction surface. The increased gap at the friction surface may not allow sufficient flow restriction to build up pressure against the coast thrust force in order to close the clutch during coast engagement. These forces must be overcome to fully engage the clutch. In coast, once the touching of the plates is achieved, the flow restriction is such that sufficient apply pressure is available to engage the clutch.

For improved clutch engagement for torque converters with turbine clutches, in an example aspect, a flange and a cover plate pair are arranged to be axially displaceable, at least locally or partially, to expand thus encouraging engagement of a torque converter turbine piston lockup clutch. Advantageously, this arrangement may be utilized in the coast condition and is conversely also applicable to the drive condition where necessary. For example, extra clutch capacity may be required in drive at higher engine torque conditions and/or when the transmission cannot supply enough pressure for full clutch lockup.

In an example aspect, at least one of the components of the damper assembly, i.e. the first cover plate, the second cover plate, and/or the flange, includes at least one ramp. As the damper winds up in either coast or drive modes and as tailored to specific torque converter conditions, the flange rotates relative to the cover plate(s) so that the ramp presses against the oppositely facing component until axial expansion of the damper assembly, at least locally, is achieved. As the damper assembly expands, the flange reacts on the cover or housing, which is fixed, in other words pressing against the cover thus urging the at least one cover plate to force the clutch to close. In an example aspect, the clutch is a turbine piston for engagement with an impeller.

The following description is made with reference to FIGS. 1 through 5C. FIG. 1 illustrates a partial cross sectional side view of a torque converter including a damper assembly having clutch engagement damper ramps according to an example aspect. Torque converter 10 includes front cover 12 for connecting to a crankshaft of internal combustion engine 5 via stud 11 and rear cover 16, also referred to as impeller shell interchangeably herein, for an impeller 18. Impellers are also referred to in the art interchangeably as 'pump'. Front cover 12 and rear cover 16 are fastened together via weld 14. Cover 12 includes cover pilot portion 90. Torque converter 10 also includes turbine 20, turbine shell 22, and stator 32 between turbine 20 and impeller 18. Turbines and impellers, as is known in the art, include a plurality of blades 21 and 19, respectively. Torque converter 10 of FIG. 1 includes clutch 15 including extended portion 23 of turbine shell 22, also referred to as turbine piston 23 or clutch plate 23 interchangeably herein. In an example aspect, impeller shell 16 includes inner portion 17, also referred to as apply plate 17 interchangeably herein. Friction material 25 is disposed between clutch plate 23 and apply plate 17. Friction material 25 is attached to clutch plate 23, to apply plate 17, or to both.

Torque converter 10 includes one-way clutch 30, which supports stator 32 and includes inner race 88, roller 92, and outer race 94. Side plate 36 holds one-way clutch 30 in place within stator 32. Thrust bearing 34 is situated between side plate 36 and impeller shell 16. Torque converter 10 also includes damper assembly 40, which is connected to and drivable by turbine 20, and is positioned between turbine 20 and front cover 12. Damper assembly 40 includes springs 42, flange 46, first cover plate 24, and second cover plate 26, fixed to turbine shell 22 via rivet 48. Springs 42 are at least partially disposed between cover plates 24 and 26. Cover plates 24 and 26 may include window openings 27 and wings 29 (shown in FIG. 3) as are known in the art to accommodate, position, and axially support the springs. Damper assembly 40 optionally includes bushing 44 and thrust washer 28. In an example aspect, flange 46 axially thrusts against or is axially supported by cover 12 via bushing 44 supporting thrust washer 28. Thrust washer 28 is attached to cover 12 by methods known in the art, such as projection welding, for example. The clutch engagement damper assembly 40 including ramps of FIG. 1 is in clutch open mode, in other words, ramps are not engaged and first axial gap g1 is defined as the space between first cover plate 24 and flange 46 second axial gap g2 is defined as the space between flange 46 and second cover plate 26. In open clutch mode, clutch plate 23 does not touch apply plate 17, the space disposed therebetween is shown as clearance 13. Moreover, the first axial gap g1 decreases and second axial gap g2 increases upon ramp engagement. Flange 46 remains stationary, in other words is not axially displaced during ramp engagement, as displacement of flange 46 is restricted by cover 12. Therefore, flange 46 reacts on cover 12, which is fixed, to apply a thrust force (F as shown in FIG. 5C) to second cover plate 26, which in turns applies a thrust force to turbine shell 22 at rivet 48, and thus applies a thrust force at clutch plate 23 to close clearance 13 to engage clutch 15. In other words, clearance 13 between clutch plate 23 and apply plate 17 equals zero. Clutch 15 is engaged when clutch plate 23 and apply plate 17 touch; or in an example aspect, wherein the clutch further comprises friction material 25, the clutch plate 23 touches friction material 25 which touches apply plate 17 to engage clutch 15.

Torque converter 10, as shown in FIG. 1, further includes hub 80 fixed to flange 46, bushing 86, weld 96, and hub 98. Transmission components spline, input shaft, and stator shaft are not shown. Hub 80 is splined to the input shaft and inner race 88 is splined to the stator shaft. Bushing 86 positions and at least partially seals turbine shell 22 on the input shaft. Torque converter 10 includes axis of rotation A, also simply referred to as axis A. First axial direction AD1 is opposite to second axial direction AD2. First radial direction RD1 is opposite to second radial direction RD2.

First circumferential direction CD1 is opposite to second circumferential direction CD2.

Figure 2:
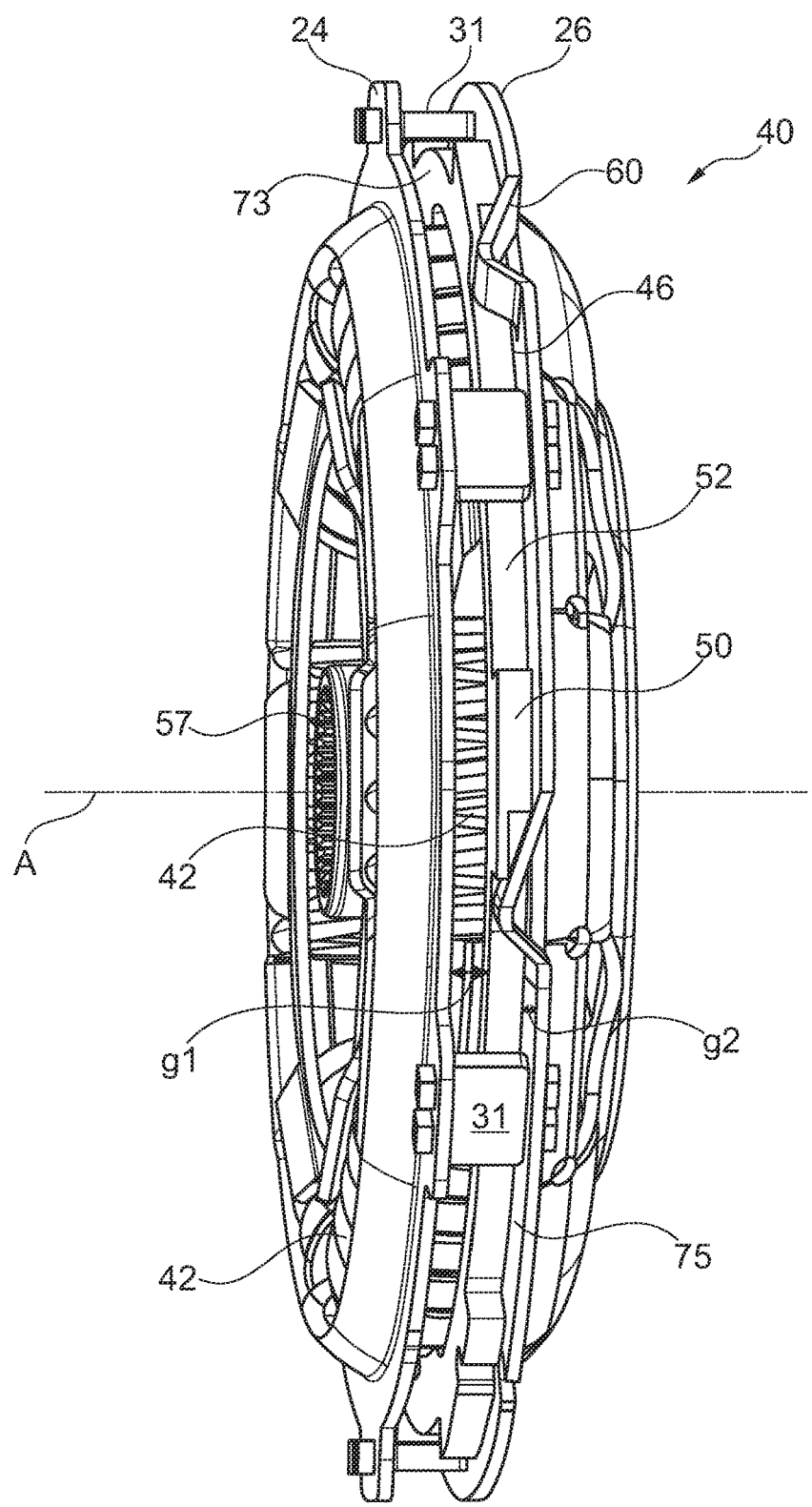
FIG. 2 illustrates a perspective view of a damper assembly having clutch engagement damper ramps according to an example aspect.
Figure 3:
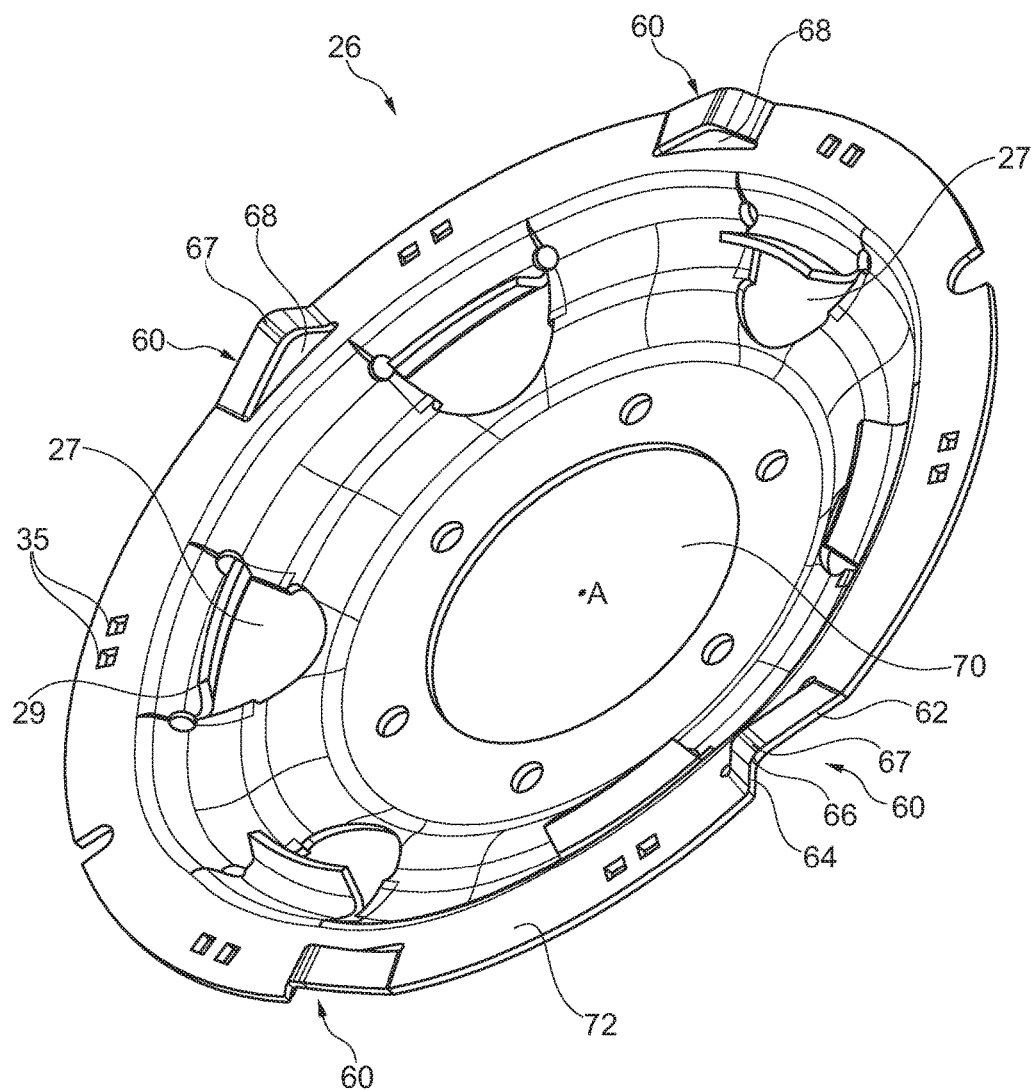
FIG. 3 illustrates a perspective view of a cover plate including ramps according to an example aspect.

FIG. 2 shows a perspective view of the damper assembly according to an example aspect. Damper assembly 40, also referred to herein interchangeably as turbine damper assembly, comprises axis of rotation A, cover plates 24 and 26 arranged to receive torque and connected by spacer rivets 31. Spacer rivets 31 maintain a substantially fixed distance at which cover plates 24 and 26 are separated. Flange 46 is rotatable about axis of rotation A and axially disposed between cover plates 24 and 26. Resilient element or springs 42, for transmitting a circumferential or torque force between the flange and the cover plates, are at least partially disposed between cover plates 24 and 26. Springs 42 may protrude axially through cover plate openings, referred to herein as cover plate windows (windows 27 as shown in FIG. 3), to accommodate and position springs 42. Cover plate 26 includes a plurality of ramps 60 at or near radially outward surface 72 of the cover plate. Ramps 60 may be stamped into the cover plate and included integrally or may be otherwise attached or welded onto the cover plate. Ramp 60 protrudes axially in axial direction AD2 in an example aspect according to FIG. 2. Flange 46 includes tab 50 protruding radially outward from outer circumferential edge 52. Flange 46 includes opening 57 for spline engagement with a transmission input shaft. Ramp engagement occurs during rotation of the flange relative to the cover plates about axis A. As shown for coast mode in FIG. 2, ramp engagement is achieved via rotation in circumferential direction CD1. In another example aspect or alternatively, as one skilled in the art would recognize, ramps are arranged to be included on either the at least one cover plate or flange so long as that the ramps are engageable to another of the at least one cover plate or flange. Ramps are arrangeable to engage in either coast or drive mode or both. In an example aspect, ramp engagement provides thrust forces to ultimately effect a movement, displacement, or deflection of the clutch plate so as to engage or close the clutch. FIG. 2 further shows gaps g1 and g2. First axial gap g1, having a first width w1, is disposed between flange 46 and first cover plate 24; and second axial gap g2, having a second width w2, is disposed between flange 46 and second cover plate 26. At least one of first cover plate 24, second cover plate 26, or flange 46 comprises at least one ramp 60 protruding in an axial direction (AD1 or AD2 or both) arranged so that the ramp is rotatably engageable with another of the at least one of first cover plate 24, second cover plate 26, or flange 46 to decrease first axial gap g1 to a third width w3, increase second axial gap g2 to a fourth width w4, and transmit an axial force F1 to displace cover plate 26 thus urging a clutch to engage.

In an example aspect, turbine damper assembly 40 comprises cover plate 26 including at least one ramp 60 wherein flange 46 rotates about axis of rotation A in a first circumferential direction CD1 relative to first and second cover plates 24 and 26 in coast mode to rotatably engage the at least one ramp to decrease first axial gap g1 and increase second axial gap g2. In another example aspect, flange 46 rotates about axis of rotation A in second circumferential direction CD2, opposite first circumferential direction CD1, in drive mode to rotatably engage at least one ramp 60 to decrease first axial gap g1 and increase second axial gap g2 to increase clutch capacity. In yet another example aspect, second cover plate 26 includes at least one ramp 60 wherein flange 46 comprises outer circumferential edge 52 having at least one tab 50 protruding therefrom, wherein tab 50 is rotatably engageable with ramp 60.

FIG. 3 illustrates a cover plate according to an example aspect. Cover plate 26 includes ramps 60, cover plate windows 27, holes 35 for receiving rivets (i.e. rivets 31), and opening 70. Cover plates are contoured as known in the art to house elements of the damper assembly. The number of ramps need not be limited and varies according to design specifications. In an example aspect, cover plate 26 has at least one ramp 60. In other example aspects, at least two ramps are evenly spaced and disposed on radially outward surface 72. In other example aspects, at least three ramps are evenly spaced around radially outward surface 72. In other example aspects and as shown in FIG. 3, at least four ramps are evenly spaced around radially outward surface 72. In other example aspects, at least six ramps are evenly spaced around radially outward surface 72. In other example aspects, at least eight ramps are evenly spaced around radially outward surface 72. In other example aspects, cover plate 26 includes at least one ramp and at most twenty ramps.

Features of ramps 60 are tailored to specific needs or to accommodate varying forces for different torque converter designs. In an example aspect, and as shown in FIG. 3, ramps 60 include rise portion 62 (also referred to as first inclined portion 62), second inclined portion 64, and an apex portion 66, which includes rounded, pointed, or flat portions or combinations thereof. Ramps of FIG. 3 include apex portion 66 comprising rounded portions and flat portion 67. Portions 62 and 64 have equal heights (height h as shown in FIG. 5B). Ramps 60 of cover plate 26 are stamped in an example aspect, leaving voids referred to as punched out portions 68. While ramps may be formed by other methods known in the art, stamping provides the advantage that no more material is required to form the cover plate including ramps as compared with conventional cover plates.

Figure 4:
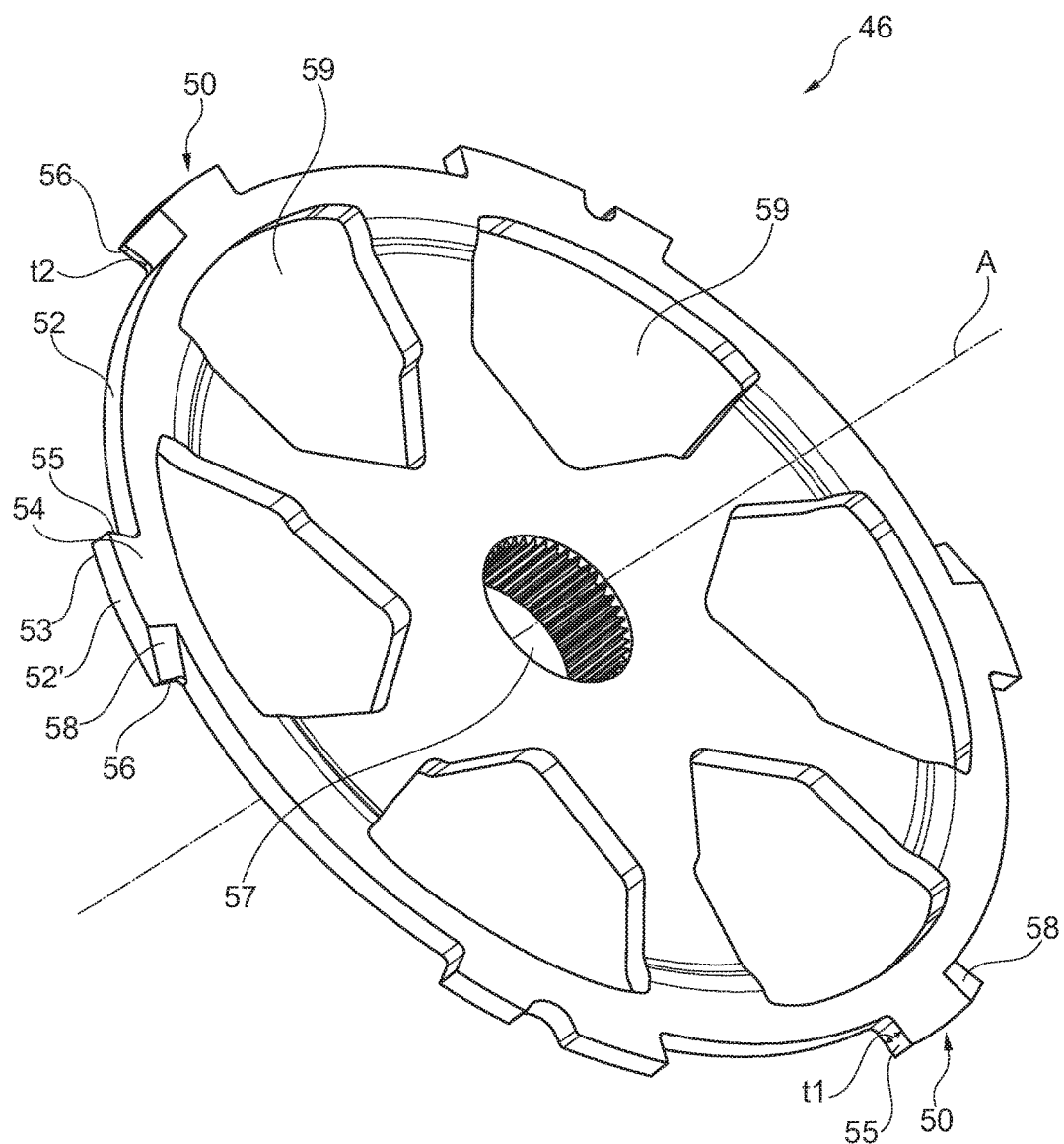
FIG. 4 illustrates a perspective view of a flange including tabs according to an example aspect.

FIG. 4 illustrates a flange according to an example aspect. Flange 46 includes opening 57 and void portions 59 to accommodate and position springs 42. Flange 46 includes tabs 50 protruding in a radially outward direction from outer circumferential edge 52. Tabs 50 include outer circumferential face 52', first and second flat surfaces 53 and 54 respectively, first side surface 55, second side surface 56, and tapered surface 58. Tapered surface 58 and flat surface 54 are rotatably engageable with ramps 60 of cover plate 26 when combined in damper assembly 40.

FIGS. 5A-5C illustrate a slice through a damper assembly according to an example aspect as viewed near the outer circumference of the assembly in order to schematically illustrate ramp engagement features at varying degrees of rotation. Clutch engagement damper ramps for damper assembly 40 are shown in greater detail. FIG. 5A shows ramp 60 of cover plate 26 wherein ramp 60 is not engaged with tab 50 of flange 46 having outer circumferential edge 52. Gap g1 represents the space between cover plate 24 and flange 46, while gap g2 represents the space between flange 46 and cover plate 24. Distance d1 represents the distance between cover 12 and flange 46, while distance d2 represents the distance between cover 12 and cover plate 26.

As the damper goes into coast mode, flange 46 rotates in circumferential direction CD1 relative to cover plate 24 and 26. FIG. 5B shows tab 50 and ramp 50 at the moment just before engagement. Gap g1 represents the space between cover plate 24 and flange 46, while gap g2 represents the space between flange 46 and cover plate 24. Distance d1 represents the distance between cover 12 and flange 46, while distance d2 represents the distance between cover 12 and cover plate 26. Theses distances are unchanged from the condition of damper assembly 40 in FIG. 5A.

As the damper winds up further, flange 46 rotates further in circumferential direction CD1 and tab 50 and ramp 60 slidably contact one another until fully engaged as shown in FIG. 5C and exerting force F1 on cover plate 26. Gap g1' represents the space between cover plate 24 and flange 46, while gap g2' represents the space between flange 46 and cover plate 24. Note that g1' is less than g1 and g2' is greater than g2. This is because flange 46 is at a fixed distance d1 from cover 12, while cover plate 26 moves towards the turbine in axial direction AD1. Distance d1 remains substantially constant or unchanged in operation of the torque converter because flange 46 is supported by or thrusts against cover 12. Cover plate 26 is effectively pushed away from cover 12 due to ramp engagement. Any further rotation of flange 46 in direction CD1 results in maintaining gap g2' as apex portion 66 includes flat portion 67.

Referring again to FIGS. 1 through 5C, during ramp engagement reaction of flange 46 on cover 12 creates force F1. This force translates into displacements and/or deflections capable of closing clutch 15, in other words closing clearance 13 to engage clutch plate 23 and apply plate 17 as follows: (i) force F1 in turn acts to push or displace cover plate 26, as mentioned, in axial direction AD1; (ii) the force on cover plate 26 then acts to displace turbine shell 22, also in axial direction AD1, at connection 48; and (iii) then clutch plate 23 is displaced to eliminate clearance 13, the space or gap between clutch and apply plates, and touch apply plate 17. Friction material 25 is optionally disposed between clutch plate 23 and apply plate 17. In the drive condition, wherein the clutch is already engaged and clearance 13 equals zero so that no further displacement of turbine shell 22 and clutch plate 23 is possible, turbine shell 22 is further pressed or deflected so that clutch plate 23 applies more force translating into increased clutch capacity.

Similarly, ramps are positionable to be engaged when in drive mode, in an example aspect, as flange 46 rotates in circumferential direction CD2 (opposite to circumferential direction CD1) thus improving clutch engagement. By incorporating ramp engagement in the drive direction, seals may be advantageously eliminated.

Referring again to FIGS. 1 through 5C, torque converter 10 comprises axis of rotation A, cover 12, turbine 20 comprising turbine shell 22 and a plurality of blades 21, impeller 18 comprising impeller shell 16 and a plurality of blades 19, stator 32 comprising a plurality of blades 33. Damper assembly 40 of torque converter 10 further comprises first and second cover plates 24 and 26 arranged to receive torque wherein at least one of the first or second cover plates 24 or 26 has at least one ramp 60 protruding in an axial direction; and, at least one of the first or second cover plates 24 or 26 thrusts against turbine shell 22 at fastener or rivet 48. Flange 46 thrusts against cover 12 and axially disposed between cover plates 24 and 26. Damper assembly 40 further includes at least one resilient element 42, which is at least partially disposed axially between first and second cover plates 24 and 26, for transmitting a circumferential or torque force between flange 46 and cover plates 24 and 26. Torque converter 10 further includes clutch 15 including clutch plate 23 and apply plate 17. In an example aspect, flange 46 comprises outer circumferential edge 52 having at least one tab 50 protruding therefrom in a radial direction, wherein tab 50 is rotatably engageable with ramp 60.

In an example aspect, damper assembly 40 further includes first axial gap g1, disposed between flange 46 and first cover plate 24, having first width w1 and second axial gap g2, disposed between flange 46 and second cover plate 26, having second width w2. In an example aspect, the at least one ramp 60 is rotatably engageable with flange 46 to decrease first axial gap g1, increase second axial gap g2, and transmit axial force F for urging clutch 15 to engage, in other words, so that clutch plate 23 touches apply plate 17 and clearance 13 is eliminated. In an example aspect, friction material 25 is disposed between apply plate 17 and clutch plate 23, wherein friction material 25 is attached to one of the apply plate or the clutch plate or both. In an example aspect, impeller shell 16 includes apply plate 17 and turbine shell 22 includes clutch plate 23.

In an example aspect tab 50 of flange 46 comprises first and second flat surfaces 53 and 54 respectively, first and second side surfaces 55 and 56 respectively having first and second thicknesses t1 and t2, and at least one tapered surface 58, connecting flat surface 56 to side surface 56, wherein tapered surface 58 is rotatably engageable with ramp 60. In another example aspect, tab 50 includes two tapered surfaces: one for coast engagement and an oppositely disposed tapered surface for drive engagement. In an example aspect, ramp 60 further includes apex portion 66 and at least one rise portion 62, wherein rise portion 62 is rotatably engageable with tapered surface 58. In an example aspect, apex portion 66 includes flat portion 67 for maintaining engagement with tab 50. In an example aspect, flange 46 thrusts against cover 12. Optionally, flange 46 and cover 12 further include bushing 44, thrust washer 28, or both disposed therebetween. In an example aspect flange 46 is arranged for direct connection to a transmission input shaft. In an example aspect flange 46 is rotatable in a first circumferential direction CD1 in coast mode to engage ramp 60, react on cover 12, and move at least one of first or second cover plates 24 or 26 to displace turbine shell 22 in axial direction AD1 towards impeller 18 thus urging clutch plate 23 to touch apply plate 17. In another example aspect, flange 46 is rotatable in second circumferential direction CD2, opposite to first circumferential direction CD1, in drive mode to engage ramp 60, react on cover 12, and move at least one of first or second cover plates 24 or 26 to press turbine shell 22 in axial direction AD1 against impeller 18 thus increasing clutch capacity. In yet another example aspect, torque converter 10 includes ramps 60 engageable in both drive and coast modes.

In an example aspect torque converter 10 comprises axis of rotation A, turbine 20 comprising turbine shell 22 and plurality of blades 21, impeller 18 comprising impeller shell 16 and a plurality of blades 19; housing 7 comprising cover 12 and impeller shell. Torque converter 10 further comprises stator 32 comprising a plurality of blades 33, and damper assembly 40 comprising cover plates 24 and 26 arranged to receive torque; flange 46 rotatable about axis of rotation A, thrusts against cover 12, and axially disposed between first and second cover plates 24 and 26. Damper assembly 40 further comprises at least one resilient element or spring 42, which is at least partially disposed axially between first and second cover plates 24 and 26, for transmitting a circumferential or torque force between flange 46 and cover plates 24 and 26. In an example aspect, at least one of first cover plate 24, second cover plate 26, or flange 46 includes at least one ramp 60 protruding in an axial direction, wherein ramp 60 is rotatably engageable with another of the at least one of first cover plate 24, second cover plate 26, or flange 40. In an example aspect, torque converter 10 includes damper assembly 40 having first axial distance d1, as measured between inner surface 9 of cover 12 and a first radial surface 73 of flange 46, wherein axial distance d1 remains constant or unchanged as ramp 60 is rotatably engaged; and second axial distance d2, as measured between inner surface 9 of cover 12 and second radial surface 72 (also referred to a radially outward surface 72 interchangeably herein) of the cover plate 26, wherein axial distance d2 increases as ramp 60 is rotatably engaged. Torque converter 10 further comprises clutch 15 including clutch plate 23 and apply plate 17.

In an example aspect, turbine shell 22 of torque converter 10 is fixed to cover plate 26 and, as ramp 60 is rotatably engaged, cover plate 26 is displaced in axial direction AD1 towards impeller 18. In an example aspect, turbine shell 22 includes clutch plate 23. In an example aspect, clutch 15 of torque converter 10 is engaged as ramp 60 is rotatably engaged.

Figure 6A:
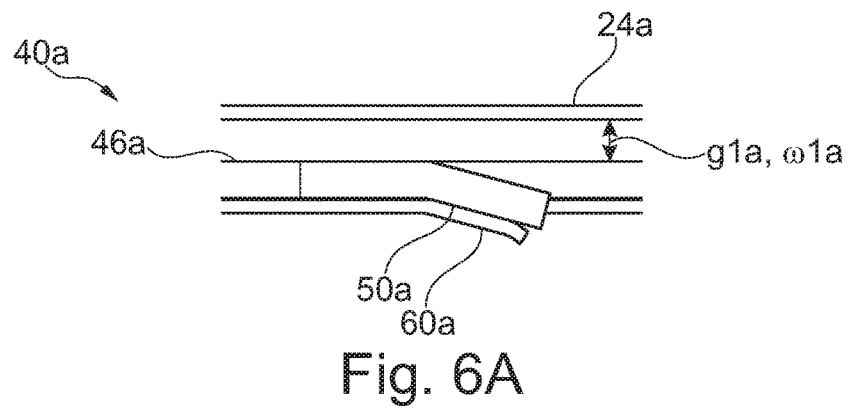
FIG. 6A illustrates a partial cross-sectional view of a damper assembly including a flange disposed between two cover plates in an example alternative aspect.
Figure 6B:
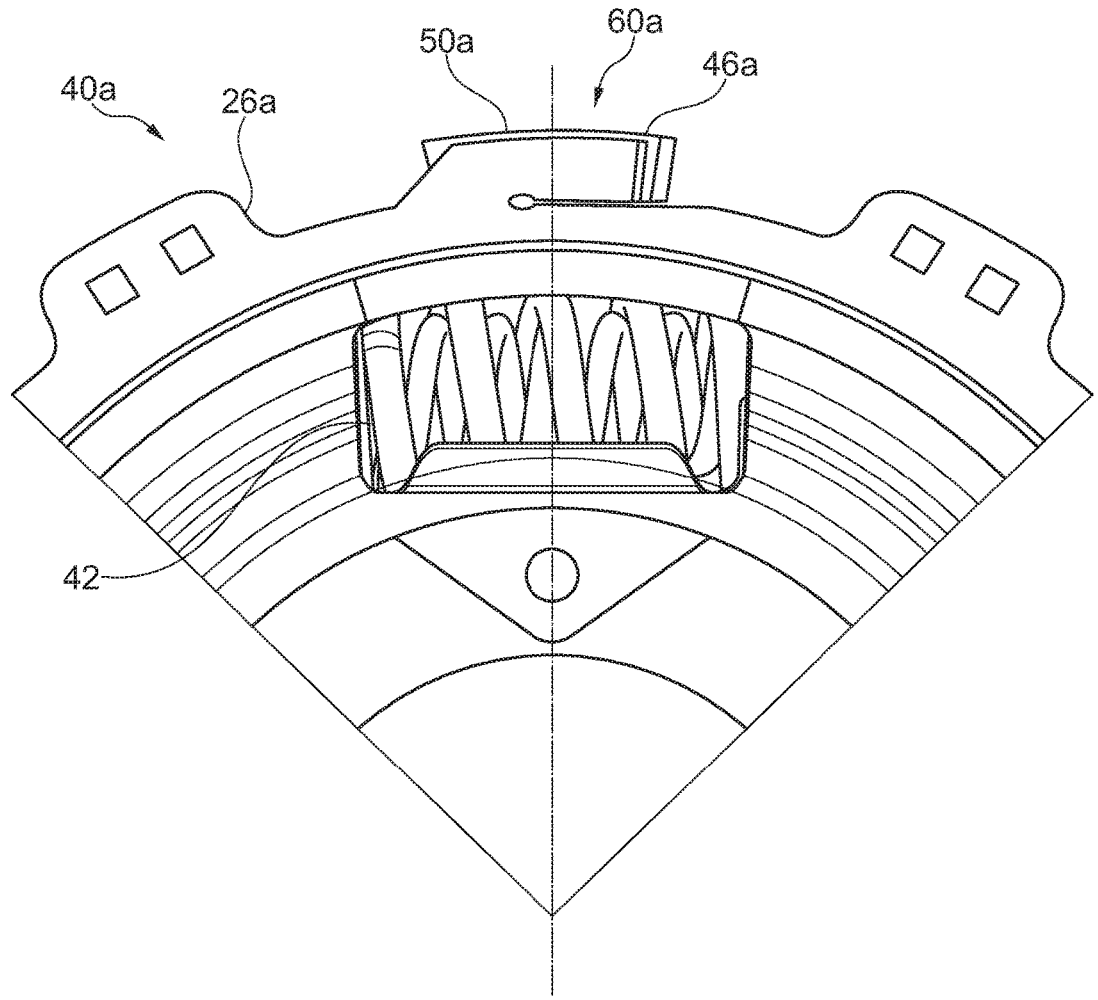
FIG. 6B illustrates a partial top view of a damper assembly wherein a cover plate is lanced to form a ramp according to an example aspect.

FIG. 6A shows a partial cross-sectional view of damper assembly 40a showing flange 46a disposed between two cover plates, 24a and 26a, in an example alternative aspect. FIG. 6B shows a partial top view of damper assembly 40a wherein cover plate 26a is lanced forming ramp 60a. Both cover plate 26a and flange 46a are lanced and are formed to the outside of the damper assembly thereby forming two ramps 50a and 60a, that when the damper is assembled, will react with each other in the coast direction causing axial movement of the piston towards the impeller in a torque converter similar to that shown in FIG. 1 (i.e. piston 23, impeller 18 of FIG. 1).

Figure 7:
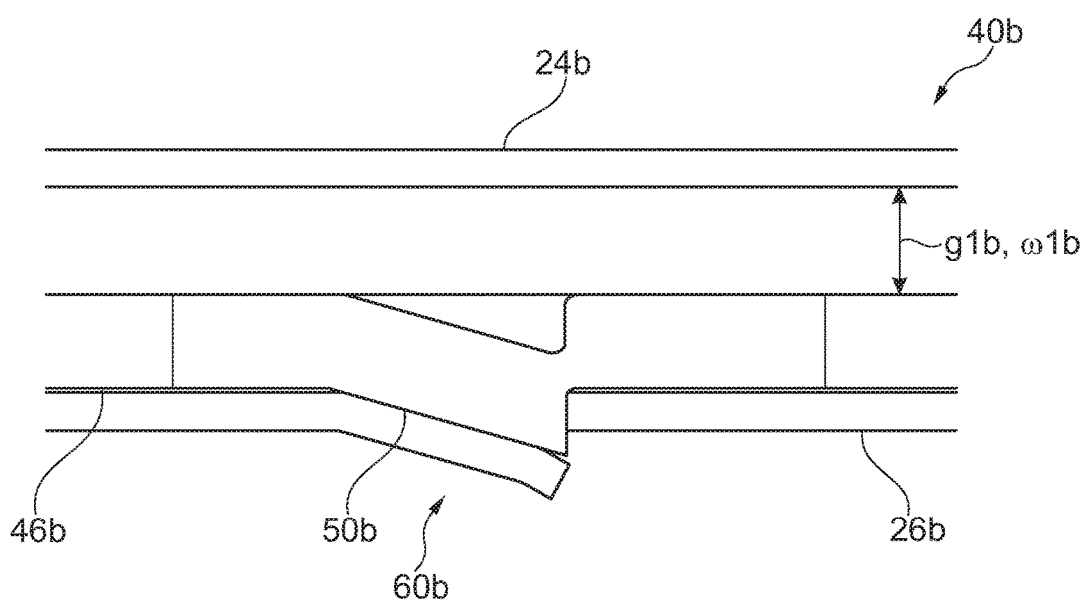
FIG. 7 illustrates a partial cross-sectional view of a damper assembly showing a cover plate is lanced and a flange is coined according to an example alternative aspect.

FIG. 7 shows a partial cross-sectional view of damper assembly 40b showing cover plate 26b is lanced and flange 46b is coined in an example alternative aspect. Cover plate 26b is lanced and formed to the outside of damper 40b to form ramp 60b. Flange 46b is coined to form ramp 50b. Ramps 60b and 50b interact or engage in the coast direction causing axial movement of the piston towards the impeller as previously described. In an example aspect, flange ramp 50b is stiffer than flange ramp 50a, for example, providing for a more predictable axial load for improved durability.

Figure 8A:
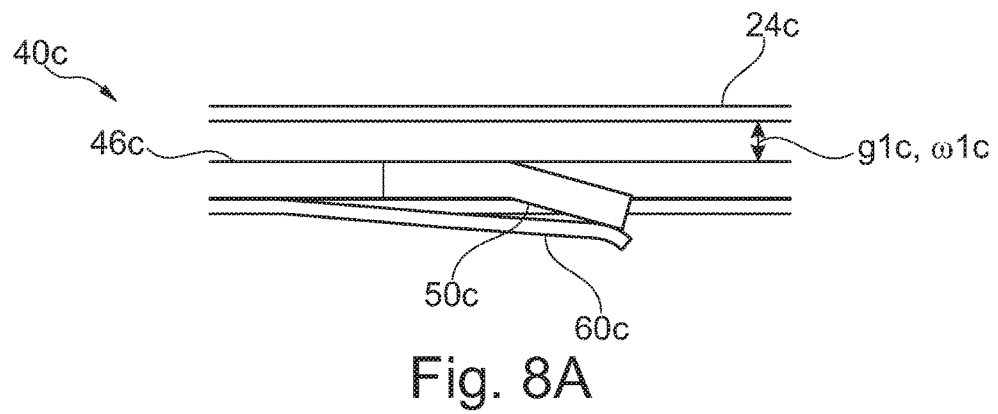
FIG. 8A illustrates a partial cross-sectional view of a damper assembly showing a flange disposed between two cover plates according to an example alternative aspect.
Figure 8B:
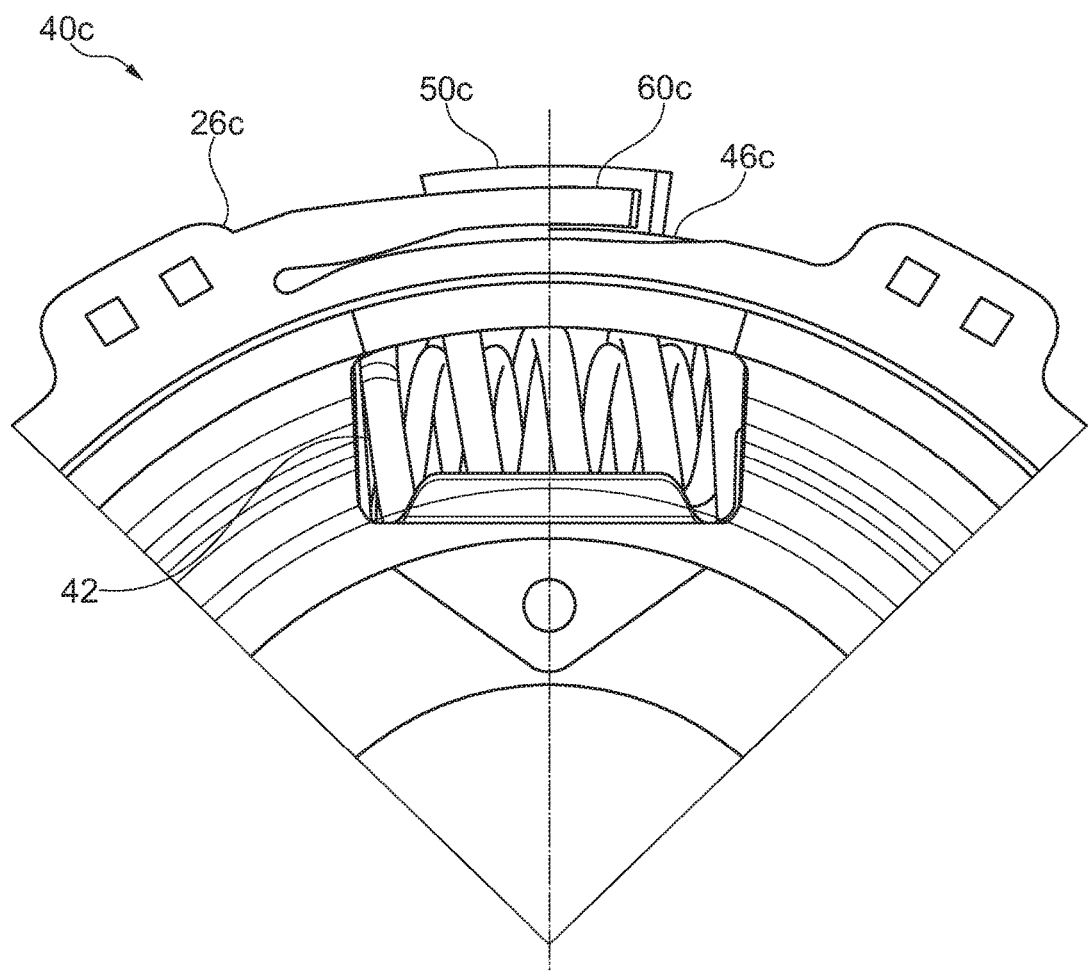
FIG. 8B shows a partial top view of a damper assembly wherein a cover plate is lanced to form an elongated finger ramp according to an example aspect.

FIG. 8A shows a partial cross-sectional view of damper assembly 40c showing flange 46c disposed between two cover plates, 24c and 26c, in an example alternative aspect. FIG. 8B shows a partial top view of damper assembly 40c wherein cover plate 26c is lanced to form elongated finger ramp 60c. Flange 46c is also lanced to form ramp 50c engageable with finger ramp 60c. Finger ramp 60c acts as a spring as ramp 50c pushes against it. As a result of the engagement of ramps 50c and 60c, cover plate 24c is then displaced sufficiently to engage the piston while the load is only dependent on the spring force. This advantageously enables the damper to still wind up in coast with the addition of hysteresis added by the contact between the flange and ramp finger 60c.

Figure 9:
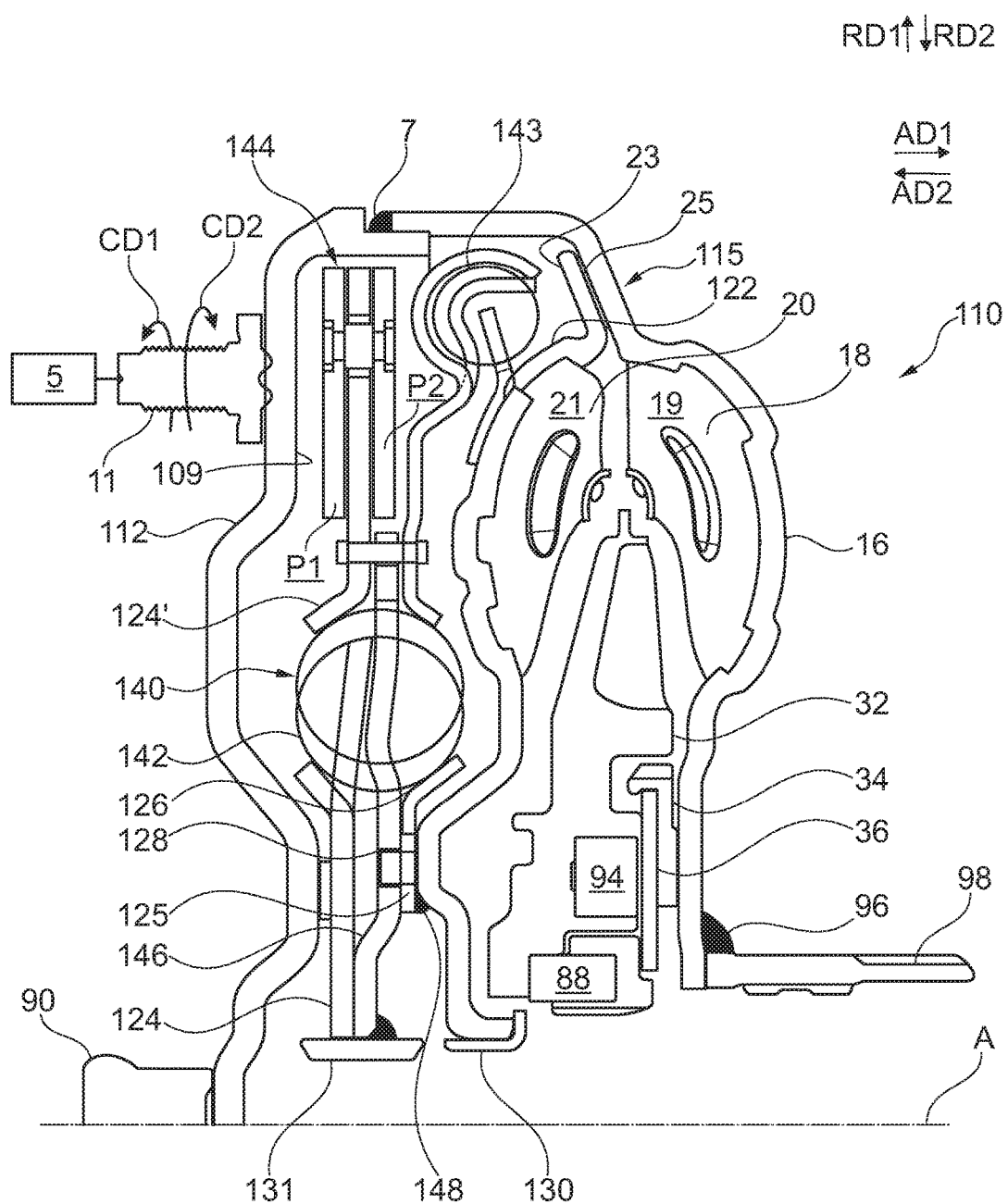
FIG. 9 illustrates a cross-sectional view of a torque converter including a turbine damper assembly comprising a hardened ramp plate according to another example aspect.

FIG. 9 shows a cross-sectional view of a torque converter including turbine damper assembly 140 comprising a hardened ramp plate in an example aspect. Hardened ramp plate 125 is also referred to interchangeably herein as plate 125. Elements common to torque converter 10 of FIG. 1 and torque converter 110 of FIG. 9 are numbered similarly. Torque converter 110 comprises axis of rotation A, flange 146 rotatable about axis A, turbine shell 122 independently rotatable about axis of rotation A relative to flange 146, and plate 125, which is disposed between flange 146 and turbine shell 122. Hardened ramp plate 125 is fixed to turbine shell 122 at weld or rivet 148. Torque converter 110 further comprises plate 126, which may be a cover plate, disposed between flange 146 and turbine shell 122. Plate 126 is radially outward relative to plate 125 as shown in FIG. 9, or alternatively, plate 125 passes under plate 126 or through plate 126 in lower travel applications. Torque converter 110 further comprises cover 112 having inner surface 109 and plate 124, which is disposed between flange 146 and cover 112. Torque converter 110 further comprises at least one resilient element 142, which is at least partially disposed axially between plates 124 and 126 and is radially outward relative to plate 125, for transmitting a torque force between flange 146 and plates 124 and 126. In an example aspect, torque converter 110 further includes another resilient element 143 and pendulum damper 144, both radially outward relative to resilient element 142. Torque converter 110 includes flange hub 131 and bushing 130.

Figure 10:
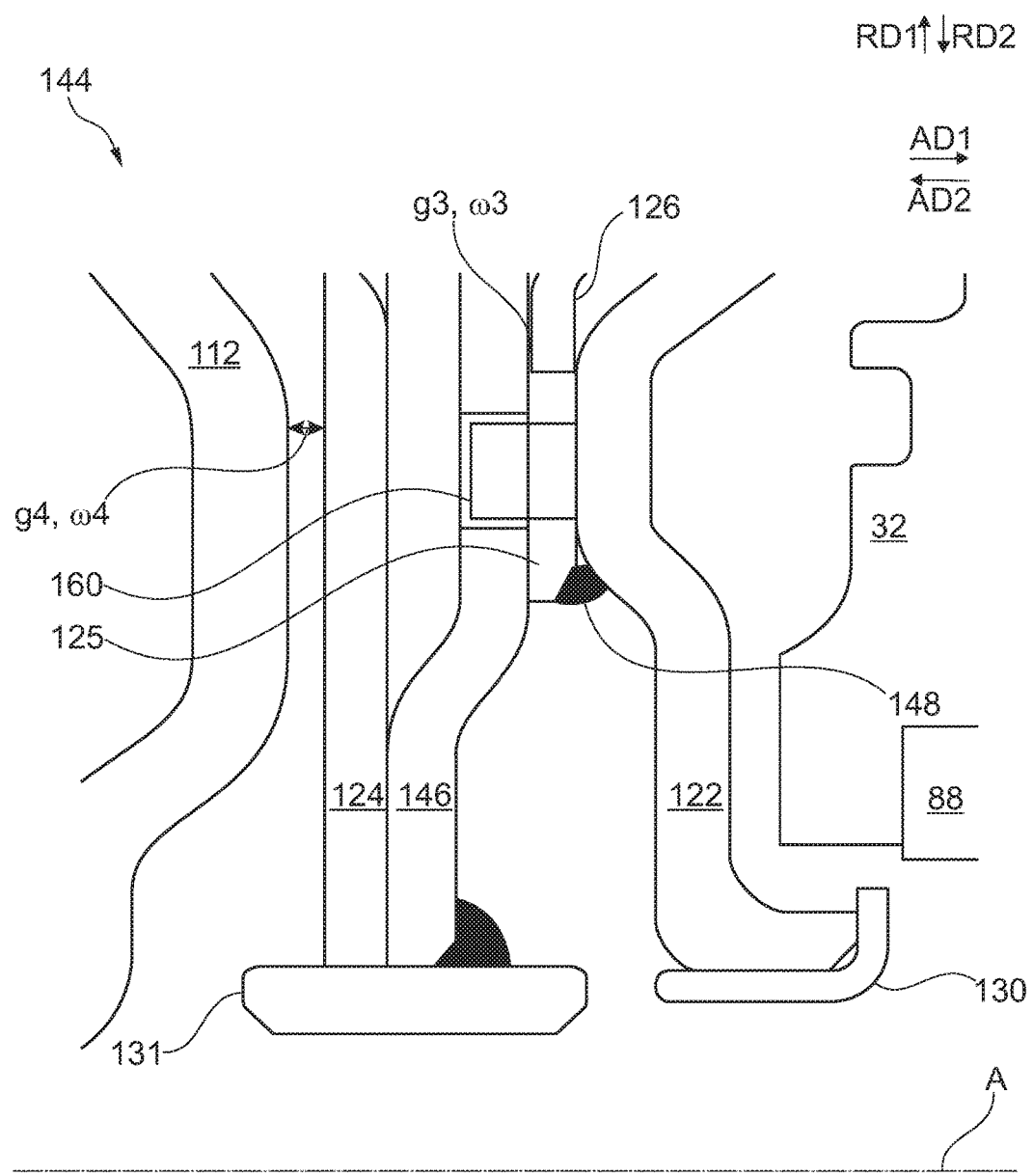
FIG. 10 illustrates a partial cross-sectional view of the torque converter as shown in FIG. 9 according to an example aspect.

Referring to FIGS. 9 and 10, torque converter 110 further comprises axial gap g3, disposed between flange 146 and plate 126, having width w3; and, axial gap g4, disposed between flange 146 and plate 124, having width w4. Plate 125 includes at least one ramp 160 protruding in axial direction AD2 toward flange 146, wherein ramp 160 is rotatably engageable with flange 146 for urging flange 146 axially in direction AD2 toward cover 112, and for transmitting an axial force for urging clutch 115 to engage. In an example aspect plate 124 includes radially outward portion 124' disposed between two pendulum masses P1 and P2.

Figure 11:
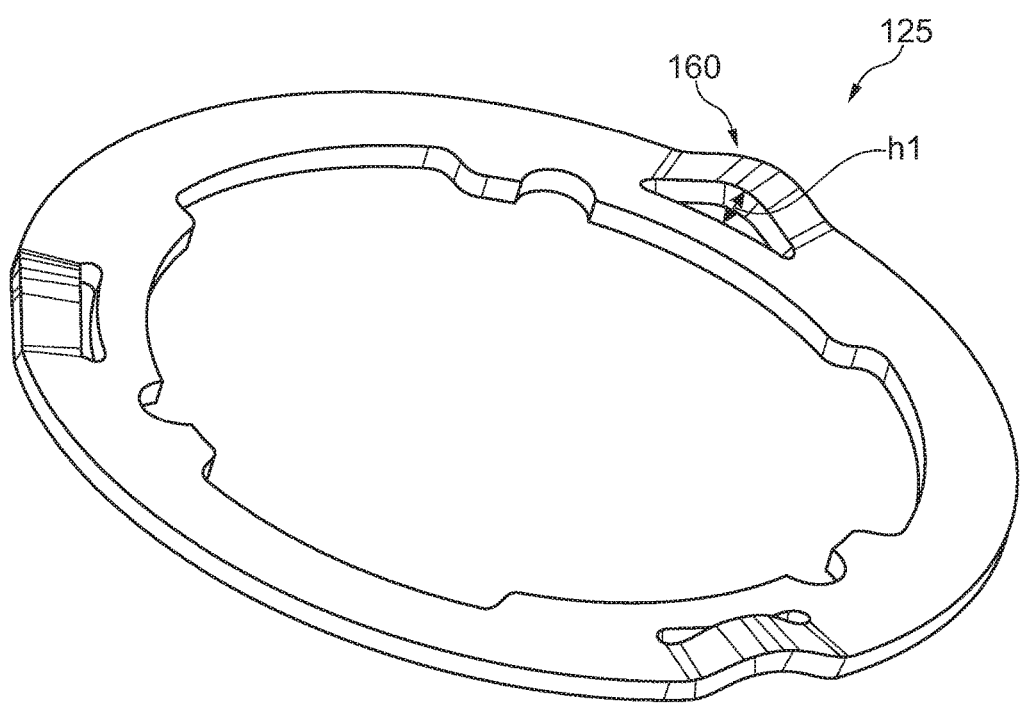
FIG. 11 illustrates a perspective view of a hardened ramp plate as shown in FIGS. 9 and 10 according to an example aspect.
Figure 12:
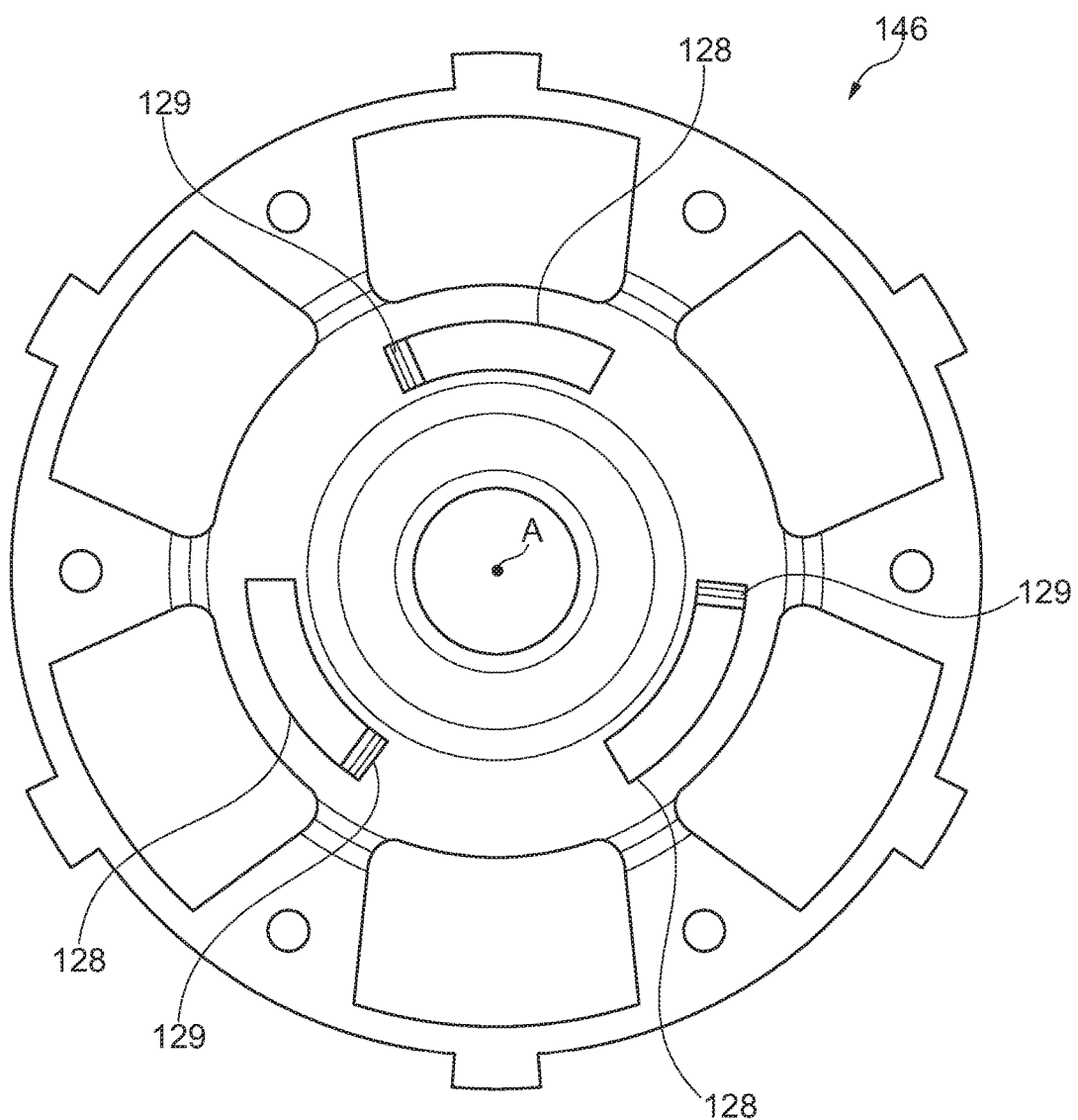
FIG. 12 illustrates a top view of a flange as shown in FIGS. 9 and 10 according to an example aspect.

In an example aspect, plate 125 is stamped and hardened. In an example aspect, plate 125 is fixed to turbine shell 122 via weld or rivet 148. In an example aspect, plate 125 is annular and is cut or lanced to integrally form the at least one ramp 160 having axial height hi as shown in FIG. 11, which is a perspective view of plate 125. In an example aspect, flange 146 is rotatable about axis of rotation A in circumferential direction CD1 relative to plates 124 and 126 to engage ramp 160. In an example aspect, flange 146 is rotatable about axis of rotation A in circumferential direction CD2, opposite circumferential direction CD1, to engage the at least one ramp 160 to increase clutch capacity. FIG. 12 shows a top view of flange 146 as in an example aspect. Flange 146 includes openings 128 including flange ramps 129 for engaging with ramps 160 of plate 125.

Figure 13:
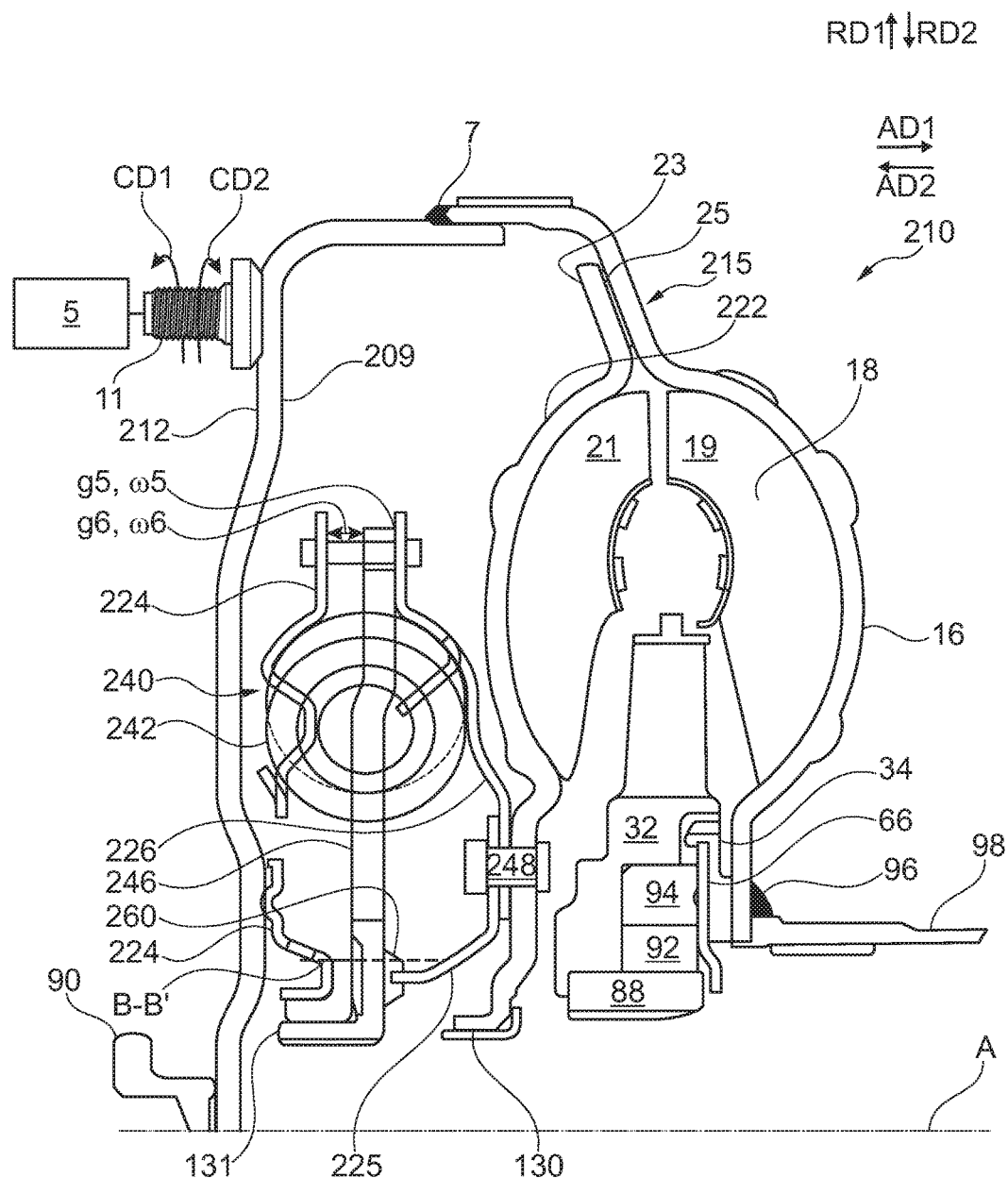
FIG. 13 illustrates a cross-sectional view of torque converter 210 wherein the turbine damper assembly includes coast engagement ramp plate according to an example aspect.

FIG. 13 shows a cross-sectional view of torque converter 210 wherein the turbine damper assembly 240 includes coast engagement ramp plate 225. Coast engagement ramp plate 225 is also referred to interchangeably herein as plate 225. Elements common to torque converters 10, 110, and 210 are numbered similarly. Torque converter 210 includes plate 226 is fixed to turbine shell 222. In an example or alternative aspect, plates 225 and 226 are integrally formed. Torque converter 210 further comprises axis of rotation A, flange 246 rotatable about axis A, turbine shell 222 independently rotatable about axis of rotation A relative to flange 246, and plate 225, which is disposed between flange 246 and turbine shell 222. Hardened ramp plate 225 is fixed to turbine shell 222 at weld or rivet 248. Torque converter 210 further comprises plate 226, which may be a cover plate, also disposed between flange 246 and turbine shell 222. Plate 226 is at least partially radially outward relative to plate 225 as shown in FIG. 13, or alternatively, plate 225 is integrally formed with plate 226 in alternative example aspects. Torque converter 210 further comprises cover 212 having inner surface 209 and plate 224, which is disposed between flange 246 and cover 212, and which may also be a cover plate. Torque converter 210 further comprises at least one resilient element 242, which is at least partially disposed axially between plates 224 and 226 and is radially outward relative to plate 225, for transmitting a torque force between flange 246 and plates 224 and 226.

Figure 14:
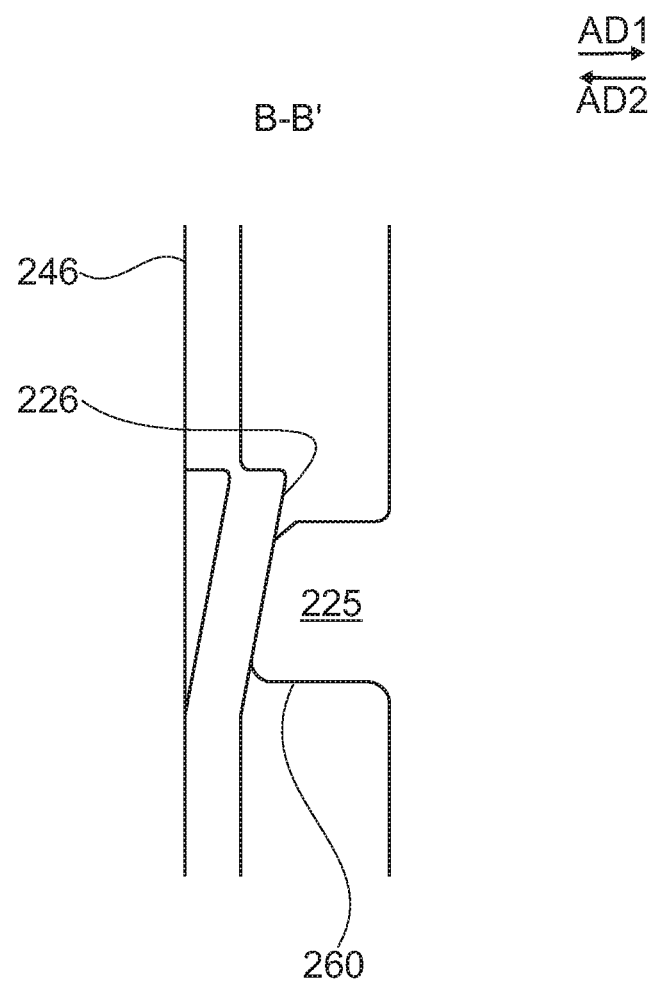
FIG. 14 illustrates a partial cross-sectional view of a flange engaging with the coast engagement ramp plate ramps of FIG. 13 according to an example aspect.

Referring to FIGS. 13 and 14, torque converter 210 further comprises axial gap g5, disposed between flange 246 and plate 226, having width w5; and, axial gap g6, disposed between flange 246 and plate 224, having width w6. Plate 225 includes at least one ramp 260 protruding in axial direction AD2 toward flange 246, wherein ramp 260 is rotatably engageable with flange 246 for urging flange 246 axially in direction AD2 toward cover 212, and for transmitting an axial force for urging clutch 215 to engage.

In an example aspect, plate 225 is fixed to turbine shell 222 via weld or rivet 248. In an example aspect, flange 246 is rotatable about axis of rotation A in circumferential direction CD1 relative to plates 224 and 226 to engage ramp 260. In an example aspect, flange 246 is rotatable about axis of rotation A in circumferential direction CD2, opposite circumferential direction CD1, to engage the at least one ramp 260 to increase clutch capacity. Flange 246 includes flange ramps 229 for engaging with ramps 160 of plate 125 as shown in FIG. 14, illustrating flange 246 engagement with ramp 260 along line B-B' of FIG. 13.

In another example aspect, and as shown in FIGS. 1-14 torque converter (10, 110, 210) comprises axis of rotation A, first and second cover plates (24, 26; 124, 126) arranged to receive torque; flange (46, 146) rotatable about axis of rotation A; turbine shell (22, 122, 222) independently rotatable about axis of rotation A relative to flange (46, 146); an optional plate (125, 225), disposed between flange (46, 146) and turbine shell (22, 122, 222), fixed to turbine shell (22, 122, 222) and arranged to receive torque; at least one resilient element (42, 142), at least partially disposed axially between the first and second cover plates (24, 26; 124, 126) and radially outward relative to the third plate (125, 225), for transmitting a torque force between between flange (46, 146) and first and second cover plates (24, 26; 124, 126); first axial gap (i.e. g1), disposed between flange (46, 146) and first cover plate (26, 126), having first width (i.e., w1); second axial gap (i.e. g2), disposed between flange (46, 146) and second cover plate (24, 124), having second width w2; one of first cover plate (26, 126), second cover plate (24, 124), or third plate (125, 225) having at least one ramp (60, 160, 260) protruding in an axial direction toward flange (46, 146), the ramp rotatably engageable with flange (46, 146) for urging flange (46, 146) axially in a direction toward cover (12, 112), and for transmitting an axial force for urging clutch (15, 115) to engage.

Of course, changes and modifications to the above examples of the present disclosure should be readily apparent to those having ordinary skill in the art, without departing from the spirit or scope of the present disclosure as claimed. Although the present disclosure is described by reference to specific preferred and/or example embodiments, it is clear that variations can be made without departing from the scope or spirit of the present disclosure as claimed.

What we claim is:

1. A torque converter comprising:
   an axis of rotation;
   a flange rotatable about the axis of rotation;
   a turbine shell independently rotatable about the axis of rotation relative to the flange;
   a first plate, disposed between the flange and the turbine shell, fixed to the turbine shell;
   a second plate, disposed between the flange and the turbine shell, radially outward relative to the first plate, wherein the second plate is fixed to the turbine shell;
   a cover having an inner surface;
   a third plate, disposed between the flange and the cover;
   at least one resilient element, at least partially disposed axially between the second and third plates and radially outward relative to the first plate, for transmitting a torque force between the flange and the second and third plates;
   a first axial gap, disposed between the flange and the second plate, having a first width;
   a second axial gap, disposed between the flange and the third plate, having a second width; and
   the first plate having at least one ramp protruding in an axial direction toward the flange, the ramp rotatably engageable with the flange for urging the flange axially in a direction toward the cover, and for transmitting an axial force for urging a clutch to engage.

2. The torque converter of claim 1, wherein the first plate is stamped and hardened.

3. The torque converter of claim 1, wherein the first plate is fixed to the turbine shell via a weld or a rivet.

4. The torque converter of claim 1, wherein the first plate is an annular plate and is cut or lanced to integrally form the at least one ramp having a first axial height.

5. The torque converter of claim 1, wherein the flange is rotatable about the axis of rotation in a first circumferential direction relative to the second and third plates to engage the at least one ramp to increase the first axial gap and decrease the second axial gap.

6. The torque converter of claim 5, wherein the flange is rotatable about the axis of rotation in a second circumferential direction, opposite the first circumferential direction, to engage the at least one ramp to decrease the first axial gap and increase the second axial gap to increase clutch capacity.

7. The torque converter of claim 1, wherein the first and second plates are connected to each other via a rivet or a weld.

8. The torque converter of claim 1, wherein the second width of the second axial gap is greater than the first width of the first axial gap.

9. A torque converter comprising:
   a cover;
   a flange rotatable about an axis of rotation;
   a turbine shell independently rotatable about the axis of rotation relative to the flange;
   a first plate disposed between the flange and the turbine shell, wherein the first plate is fixed to the turbine shell, the first plate being rotatably engageable with the flange and arranged to urge the flange axially in a direction toward the cover to transmit an axial force for engagement of a clutch;
   a second plate disposed between the flange and the turbine shell, wherein the second plate is radially outward relative to the first plate and fixed to the turbine shell;
   a third plate disposed between the flange and the cover; and
   a resilient element, at least partially disposed axially between the second and third plates and radially outward relative to the first plate, configured to transmit a torque force between the flange and the second and third plates.

10. The torque converter of claim 9, wherein the first plate, the second plate, and the turbine shell are connected to each other via a single connection.

11. The torque converter of claim 10, wherein the single connection is a rivet or weld.

12. The torque converter of claim 9, wherein the first and second plates are connected to each other via a rivet or a weld.

* * * * *